(12) United States Patent
Robison et al.

(10) Patent No.: US 6,892,753 B2
(45) Date of Patent: May 17, 2005

(54) STRUCTURE FOR CONVERTING A MECHANICAL JOINT TO A FUSION JOINT

(75) Inventors: Dave Robison, Ashtabula, OH (US); Steven J. Passerell, Rock Creek, OH (US); Jason Knaus, Euclid, OH (US)

(73) Assignee: Perfection Corporation, Madison, OH (US)

( * ) Notice: Subject to any disclaimer, the term of this patent is extended or adjusted under 35 U.S.C. 154(b) by 374 days.

(21) Appl. No.: 10/162,265

(22) Filed: Jun. 4, 2002

(65) Prior Publication Data

US 2003/0037648 A1 Feb. 27, 2003

Related U.S. Application Data

(60) Provisional application No. 60/296,346, filed on Jun. 6, 2001.

(51) Int. Cl.$^7$ .............................. B21D 51/40; B26D 3/00
(52) U.S. Cl. ................... 137/318; 137/15.09; 29/426.2; 29/426.4; 29/890.11; 29/700; 30/92.5; 30/94
(58) Field of Search .............................. 137/318, 15.09, 137/15.12, 15.14; 29/426.4, 426.1, 426.2, 890.11, 700, 720, 237, 402.03; 30/92, 92.5, 93–95; 83/54

(56) References Cited

U.S. PATENT DOCUMENTS

| | | | | | |
|---|---|---|---|---|---|
| 3,516,426 A | * | 6/1970 | Toll | ......................... | 137/15.08 |
| 4,229,025 A | * | 10/1980 | Volgstadt et al. | ........... | 285/105 |
| 4,235,259 A | * | 11/1980 | Hudock | ..................... | 29/426.4 |
| 5,285,576 A | * | 2/1994 | Taylor | ............................ | 30/94 |
| 5,400,492 A | * | 3/1995 | Hodgson et al. | ............ | 137/318 |
| 5,425,395 A | * | 6/1995 | Brennan | ..................... | 137/318 |
| 6,131,265 A | * | 10/2000 | Bird | ............................. | 29/507 |
| 6,375,226 B1 | * | 4/2002 | Dickinson et al. | ......... | 285/21.2 |
| 6,450,544 B2 | * | 9/2002 | Becker et al. | ............. | 285/21.2 |

* cited by examiner

*Primary Examiner*—Kevin Lee
(74) *Attorney, Agent, or Firm*—Fay, Sharpe, Fagan, Minnich & McKee, LLP

(57) ABSTRACT

The converter for converting a mechanical joint to a socket fusion joint includes a body having an inner surface, a stop disposed on the inner surface, and a fusion surface extending from the stop for a distance d1. The converter also includes a marker disposed on the outer surface for providing a reference location as to where the body can be severed to keep $d1 \geq F_M$, wherein $F_M$ is the minimum fusion surface length allowable for the fusion socket joint. A method for repairing a leaking mechanical joint is provided which includes severing the mechanical coupling from the converter and the pipe. The method also includes performing a facing operation on the converter end surface to form a faced end such that the fusion surface extends between the faced end and a stop for an axial distance $d1 \geq F_M$. The method also includes delineating a stab depth measurement on the outer surface of the pipe, inserting the pipe into the passage until the stab depth measurement is adjacent the faced end, and forming a socket fusion joint having a uniform fusion length $F_L = d1$.

41 Claims, 11 Drawing Sheets

STRUCTURE FOR CONVERTING A MECHANICAL JOINT TO A FUSION JOINT

CROSS REFERENCE TO RELATED APPLICATIONS

This application claims the benefit under 35 U.S.C. 119(e) of the provisional application Ser. No. 60/296,346 filed Jun. 6, 2001, which is hereby incorporated by reference herein.

BACKGROUND OF THE INVENTION

The present invention relates generally to the art of joining conduits such as plastic pipes together and, more particularly, to the art of converting a mechanical joint to a fusion joint. The invention will be described in connection with a tapping tee for a plastic natural gas main, but those of ordinary skill in the art will quickly recognize that the invention has broader application to other systems including but not limited to plastic pipe unions, elbows, tees, and in-line connectors.

Tapping tees are generally known in the art and used to provide structure for tapping into a gas main so that gas can be conducted from the main to a home or business. One example of a tapping tee, known as a saddle fusion tapping tee, is shown generally at 10 in FIGS. 1 and 2. The fusion tapping tee 10 is typically formed of plastic and includes an arcuate portion 12 that has a radius approximating the outside radius of the gas main. The tapping tee 10 is designed to be secured to the main by heating the arcuate surface 12 with a heating iron along with a portion of the external surface of the gas main. Once heated, the heating iron is removed and the wall defining the arcuate surface 12 is caused to be brought into contact with the heated gas main where a fusion of the main and the tee occurs.

The tee includes a branch 14 to which a service line 16 extending from a home or business is connected for communication with the main. The service line 16 is interconnected with the branch 14 by means of a mechanical coupling 18 which provides a quick and convenient manner of coupling the service line to the tapping tee in the field.

The mechanical coupling 18 is typically secured to the branch 14 of the tee by a butt fusion joint 20. Often the tee 10 is fused with the mechanical coupling 18 by the manufacturer to simplify the coupling with the service line 16 in the field, although alternatively the mechanical coupling may be fused to the tee by the user. Mechanical couplings 18 adapted for butt fusion joints typically include a body having a plastic end surface (35 as shown in FIG. 3). The butt fusion joint 20 is made using a heating iron which heats the end surface of the branch 14 and the end surface 35 of the mechanical coupling 18. Once heated until the plastic softens, the heating iron is removed and the two elements are brought into engagement where a fusion bead is created as the elements cool.

One example of a mechanical coupling 18 is the stab-type coupling manufactured by Perfection Corporation and sold under the trademark PERMASERT®, which is shown in U.S. Pat. No. 5,429,025 to Volgstadt commonly assigned to the same assignee as the present invention. A stab-type coupling enables a pipe, such as the service line 16, to be coupled simply by thrusting the pipe into a cavity of the coupling where both a sealing and gripping action occurs on the exterior surface of the pipe.

As shown in FIG. 3, the pipe 16 is shown thrust into the coupling 18 until the free end 20 engages a radial wall 22 of the stiffener 24. Gripping of the pipe 16 provided by a collet 26 having ramped teeth 28. The collet 28 has the capability of expanding, and the dimensions of the pipe 16 and the collet are such that as the pipe is thrust through the collet, the collet will cause to be expanded a slight amount. Any attempted withdrawal of the pipe produces a "Chinese finger" effect as the frusto-conical surface 30 of the collet 28 is caused to engage a molded-in backup ring 32 of the coupling body 34. Attempted withdrawal, therefore, causes the collet 28 to be brought into tight fitting engagement with the external surface of the pipe 16. O-rings 36, 38 encircling the external surface of the inserted pipe 16 seal the pipe against leaks.

The coupling 18 also includes a retaining ring 42 having a plurality of teeth 44 for engaging the external surface of the pipe. The retaining ring 42 provides for additional retention of the pipe 16 in the coupling 18 upon attempted withdrawal. When the pipe 16 is attempted to be withdrawn from the coupling 18, the retaining ring 42 will be caused to move to the right of FIG. 3 causing the remaining elements to "stack up." This action brings the collet 26 into firm engagement with the backup ring 32 to provide for additional holding or gripping of the pipe 16. From the description above, it is apparent that once the service line 16 is installed in the mechanical stab-type coupling it cannot be withdrawn.

In a normal installation, the tapping tee 10 is secured to a gas main and the service line 16 is stabbed into the mechanical coupling 18. After securing the service line 16 to the main, a hole is drilled in the main whereby gas is permitted to flow into the tapping tee and into the service line. A pressure test is then run to determine whether there is any leakage at either the fusion joint between the tee and the main or at the mechanical coupling 18.

In the event that a leak should be found in the mechanical coupling 18, there is no effective way to repair the coupling since the internal components are not accessible. Indeed, in some cases, the leak is caused not by a problem with the mechanical coupling as such, but rather the presence of a score line on the pipe 16 which prevents effective sealing of the external surface of the pipe by the internal O-rings 36 and 38 of the coupling. Since there is no effective way to gain access to the sealing components of the mechanical coupling 18 and since it is not possible to withdraw the pipe 16 once inserted, a leak will normally require scrapping of the entire installation.

In light of the foregoing specifically noted deficiencies and others associated with conventional tapping tees and methods, it has been deemed desirable to provide a new and improved tapping tee and method that overcome these deficiencies and that provide better overall results.

SUMMARY OF THE INVENTION

According to the present invention, a new and improved converter for converting a mechanical joint joining the converter to a pipe to a fusion socket joint joining the converter to the pipe is provided. The converter can be included with a tapping tee, an elbow, a union, or any other suitable known construction for joining with a pipe, as an extension thereof.

In accordance with a first aspect of the invention, the converter includes a body having an inner surface forming a converter passage and an outer surface, a stop disposed on the inner surface, and a fusion surface formed on the inner surface for forming the fusion socket joint. The fusion surface extends from the stop for a distance d1. The converter also includes a marker disposed on the outer surface for providing a reference location as to where the body can be severed when converting from the mechanical joint to the fusion joint to keep $d1 \geq F_M$, wherein $F_M$ is the minimum fusion surface length allowable for the fusion socket joint.

In accordance with a second aspect of the invention, the converter is adapted to receive a facing tool inserted in the converter passage during a facing operation for removing portions of the severed end to form a faced end such that the fusion surface extends from the faced end for a uniform distance d1 and $d1 \geq F_M$, and the stop is adapted to abut the facing tool thereby preventing the further insertion of the facing tool and the further removal of portions of the severed end.

In accordance with another aspect of the invention, a tapping tee for joining a pipe to a tapped line, such as a gas line is provided. The tapping tee includes a tower having a passage for communicating with the tapped line, and a branch extending from the tower having a branch passage communicating with the tower passage. The tapping tee also includes the converter, described above, extending from the branch for converting a mechanical joint joining the tapping tee to the pipe to a fusion socket joint joining the tapping tee to the pipe.

In accordance with another aspect of the invention a facing tool for performing a facing operation on the converter is provided. The facing tool includes a cutting surface for removing material from the end surface of the converter. The facing tool also includes a plug disposed adjacent the cutting surface and having an abutment surface extending a distance H from the cutting surface wherein $H \geq F_M$ and $F_M$ is the minimum fusion surface length allowable for the fusion socket joint to be formed between the converter and the pipe. The plug is adapted to be received within the converter passage so that the plug abutment surface abuts the converter stop to prevent further movement of the facing tool into the passage during the facing operation thereby preventing the further removal of material from the end surface of the converter.

In accordance with another aspect of the invention a method for repairing a leaking mechanical joint between a tapping tee branch and a pipe joined to the branch with a mechanical coupling. The branch includes a passage, a stop formed in the passage and a fusion surface extending from the stop for forming a fusion socket joint. The method includes severing the mechanical coupling from the tapping tee branch to leave an end surface on the tapping tee branch, and severing the mechanical coupling from the pipe. The method also includes performing a facing operation on the converter end surface to form a faced end such that the fusion surface extends between the faced end and the stop for an axial distance $d1 \geq F_M$, wherein $F_M$ is the minimum axial length of fusion surface allowable for the fusion socket joint. The method also includes delineating a stab depth measurement on the outer surface of the pipe, inserting the pipe into the passage until the stab depth measurement is adjacent the faced end, and forming a socket fusion joint having a uniform fusion length $F_L = d1$.

Other features, benefits and advantages of this invention will become apparent to those skilled in the art from the following detailed description of the preferred embodiments, when read in light of the accompanying drawings.

BRIEF DESCRIPTION OF THE DRAWINGS

The invention can take form in a variety of components and arrangements of components, and from a variety of steps and arrangements of steps, preferred embodiments of which are disclosed in the accompanying drawings that form a part hereof and wherein.

DETAILED DESCRIPTION OF THE INVENTION

Figure 1:
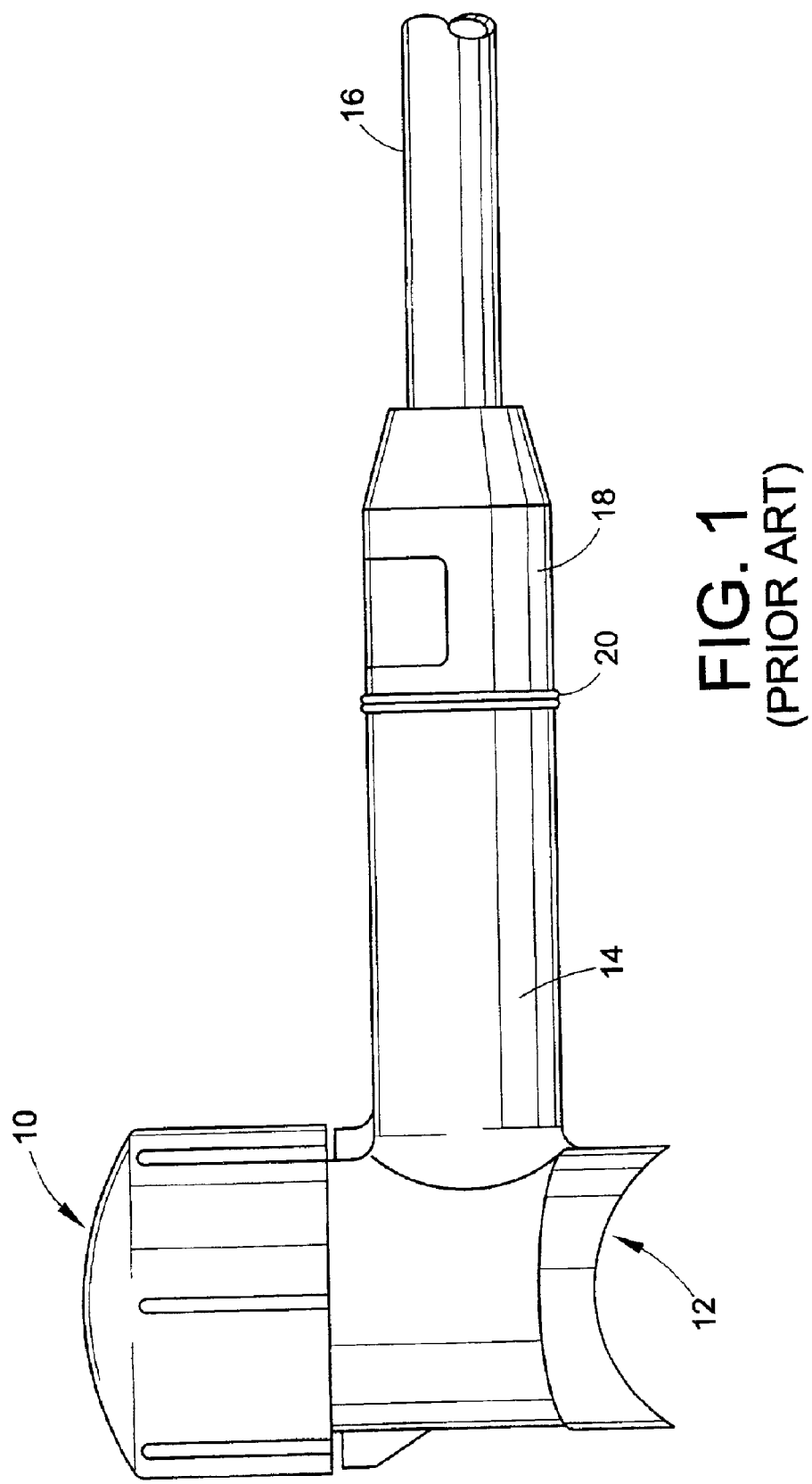
FIG. 1 is a elevational view of a conventional prior art fusion tapping tee.
Figure 2:
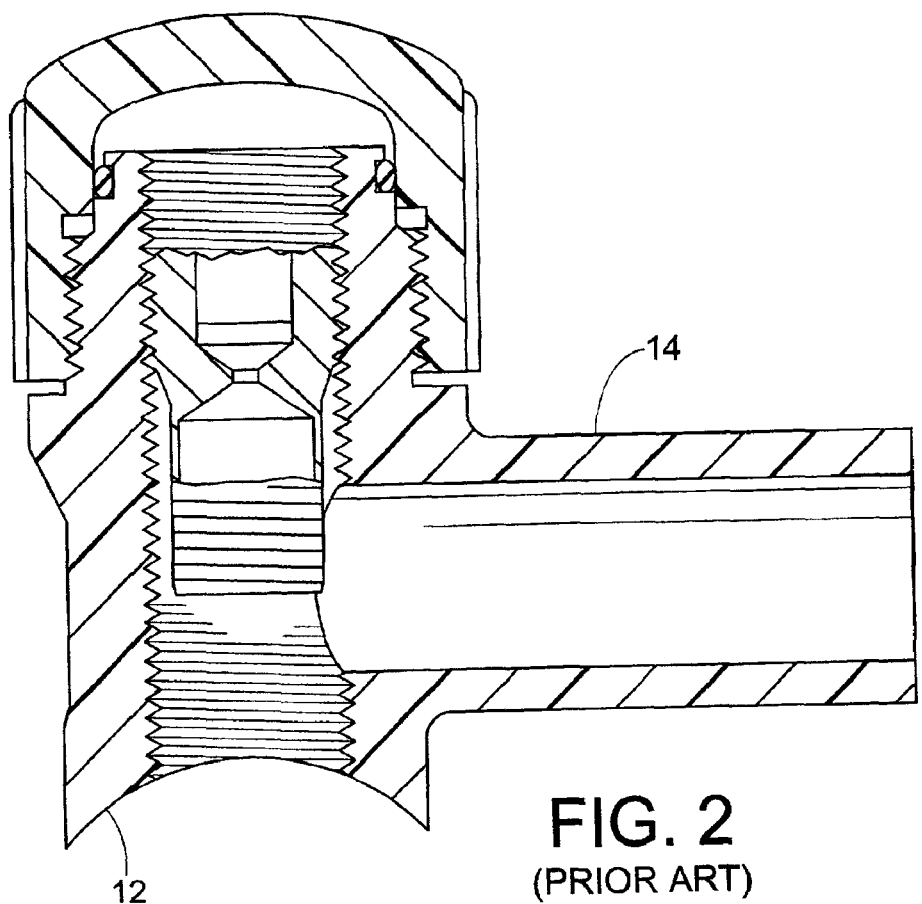
FIG. 2 is a sectional view of a conventional prior art fusion tapping tee illustrated in FIG. 1.
Figure 3:
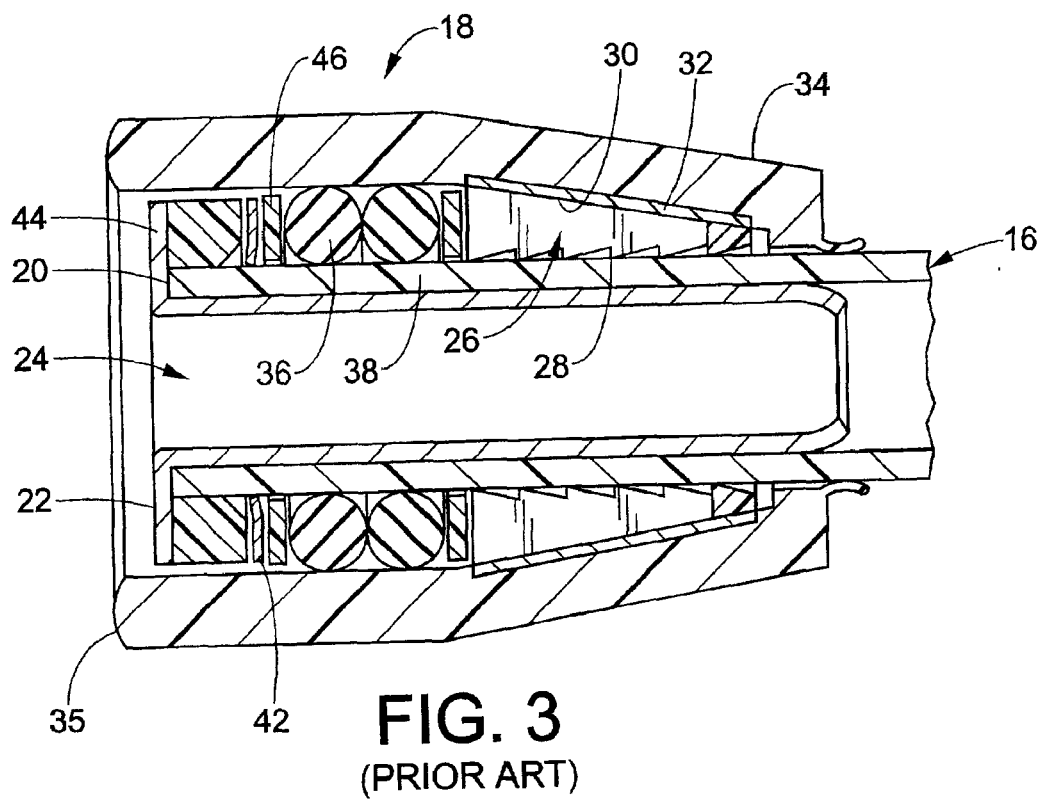
FIG. 3 is sectional view of a conventional prior art mechanical coupling illustrated in FIG. 1.

This invention is directed to structure and method for dealing with a leak as may be found in a mechanical coupling 18 which grips and seals a pipe, such as the type shown in FIG. 3.

Figure 4:
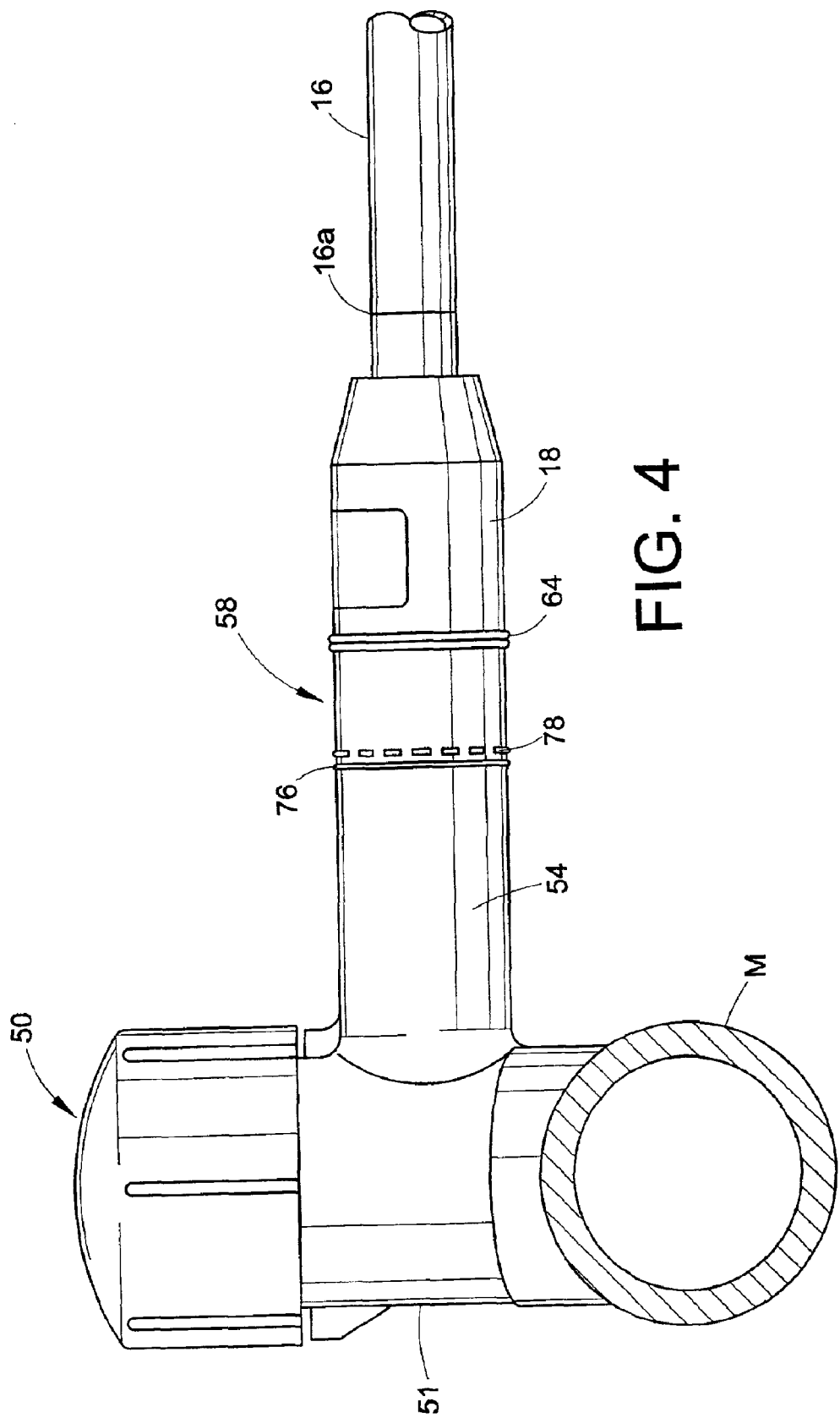
FIG. 4 is a sectional elevational view of an improved fusion tapping tee connected to a gas main and service line in accordance with the present invention.
Figure 5:
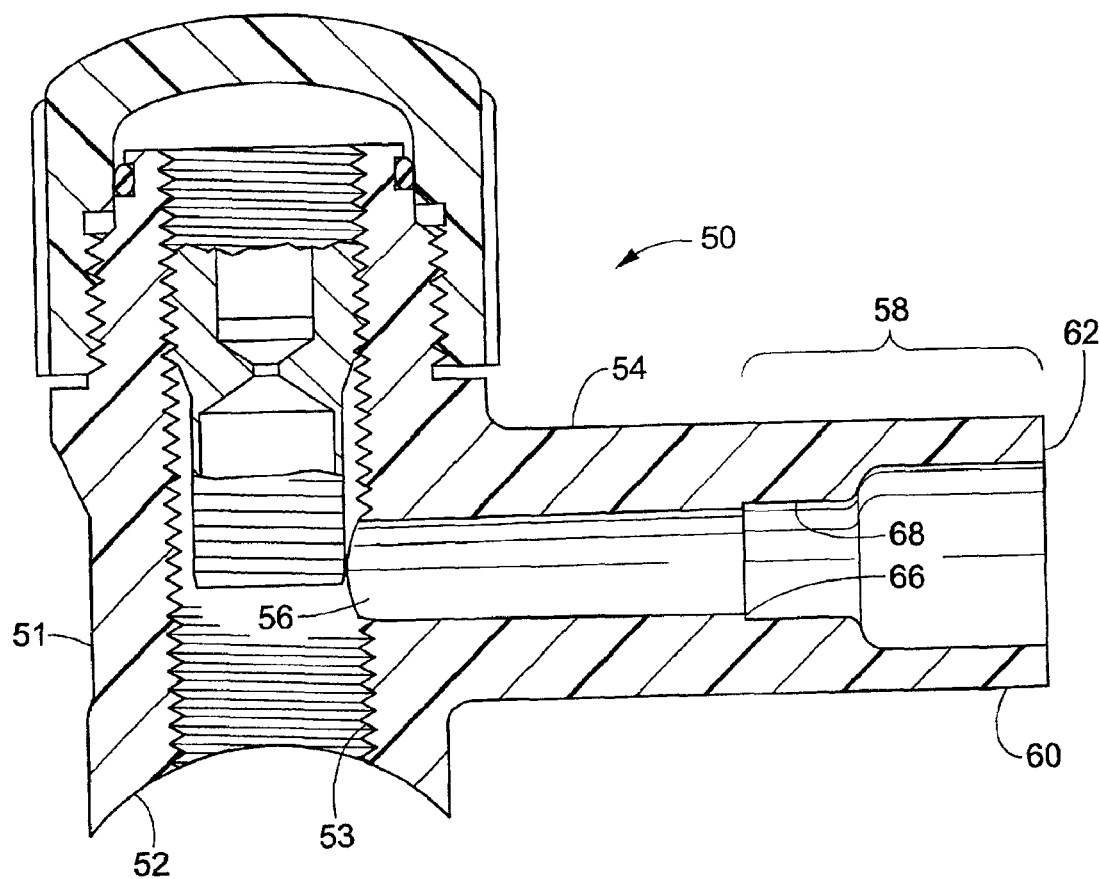
FIG. 5 is a sectional view of the improved fusion tapping tee shown in FIG. 4.
Figure 6:
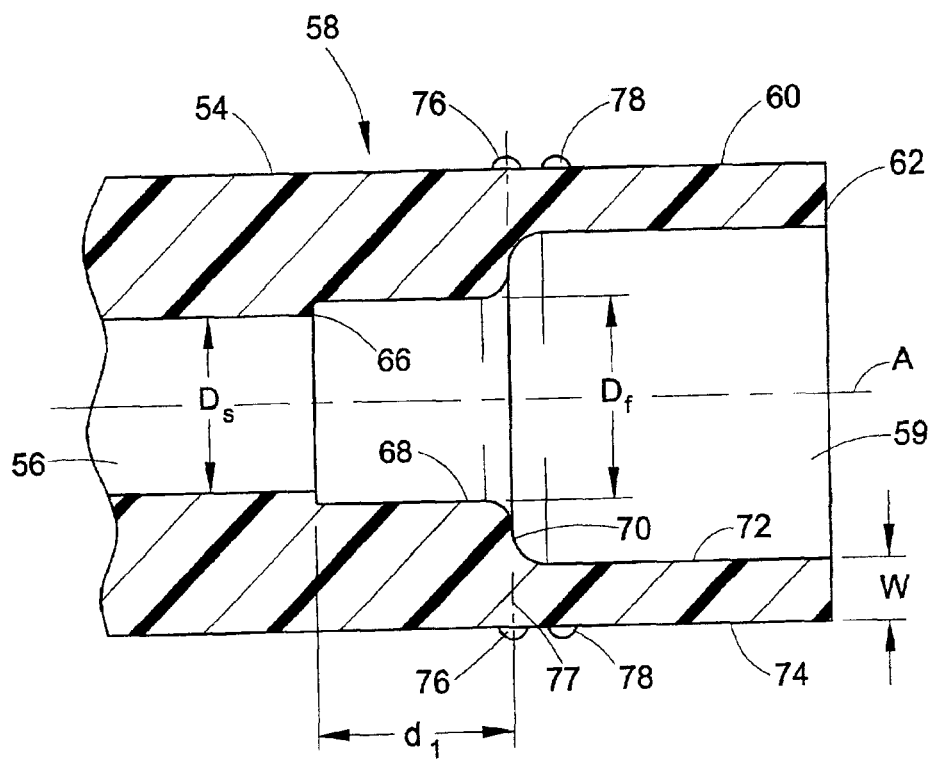
FIG. 6 is an enlarged sectional view of the fusion tapping tee branch shown in FIG. 5.

Referring to FIGS. 4–6, a fusion tapping tee according to the invention is shown generally at 50. The fusion tapping tee 50 can be formed of plastic, such as polyethylene, though alternatively, it may be formed of any material suitable for forming a fusion joint. The tapping tee 50 includes a tower body 51 having an arcuate portion 52 with a radius approximating the outside radius of a gas main. A tower passage 53 extends through the tower body 51 for communicating with the gas main M when tapped in any known manner.

The tapping tee 50 further includes a branch 54 extending from the tower body 51. The branch 54 includes an inner surface 56 forming branch passage communicating with the tower passage 53. The tapping tee 50 also includes a converter 58 having an inner surface 59 forming a converter passage extending along an axis A (see FIG. 6). The converter 58 is preferably disposed in a coaxial relationship with the branch 54 such that the converter passage 59 communicates with the branch passage 56. The converter 58 can be formed integrally with the branch 54, or alternatively, it may by joined to the branch in any suitable known manner.

The converter 58 is preferably formed of plastic, such as polyethylene, or alternatively, it may be formed of any other known material suitable for forming fusion joints. The converter 58 includes an outlet end 60 having an end surface 62 adapted to be fused to the body end surface 35 of any known mechanical coupling for gripping a pipe 16, such as the mechanical stab-type coupling 18 described above, to form a butt fusion joint 64 similar to the butt fusion joint 20 described above. The butt fusion joint 64 can be formed during manufacture or in the field. Further description of the stab-type coupling is shown in U.S. Pat. No. 4,229,025, which is hereby incorporated by reference herein. Alternatively, the mechanical coupling, or the external body thereof, can be formed integrally with the converter 58.

With reference to FIGS. 5 and 6, the converter 58 includes a stop 66 for receiving a facing tool during a facing operation as shall be described in further detail below. In the preferred embodiment, the stop 66 is a first shoulder 66 having an inner diameter shown as $D_S$. While the stop 66 shall be referred to as a shoulder in the following embodiments, it should be appreciated that the stop can be any suitable known construction, including but not limited to tabs, projections, etc., for preventing the further insertion of a pipe and/or facing tool beyond the stop as shall be described in further detail below.

The converter 58 further includes a fusion surface 68 extending from the first shoulder 66 for a predetermined distance d1 as measured along axis A. The fusion surface 68 forms at least a portion of the passage 59 extending through the converter 58.

The fusion surface 68 has a shape which is complementary to the external surface of the pipe 16 for receiving the pipe to form a socket fusion joint as shall be described in further detail below. For example, for pipes 16 having a cylindrical external surface, the fusion surface 68 has a complimentary cylindrical shape, and a diameter $D_F$ sized to receive the cylindrical external surface of the pipe 16. The diameter $D_F$ is larger than the inner diameter of the shoulder $D_S$, thereby forming the stop 66.

The fusion surface 68 preferably terminates at a second shoulder, also called a reduction shoulder 70, which defines a transition to a second internal surface 72 having a thinner wall thickness W. The wall thickness W at the converter end surface 62 is preferably approximately equal to the thickness of the mechanical coupling body end surface 35 to facilitate forming a good butt fusion joint 64. Alternatively, the converter 58 may not include the reduction shoulder 70 such that the fusion surface 68 extends to the converter end surface 62.

Figure 7:
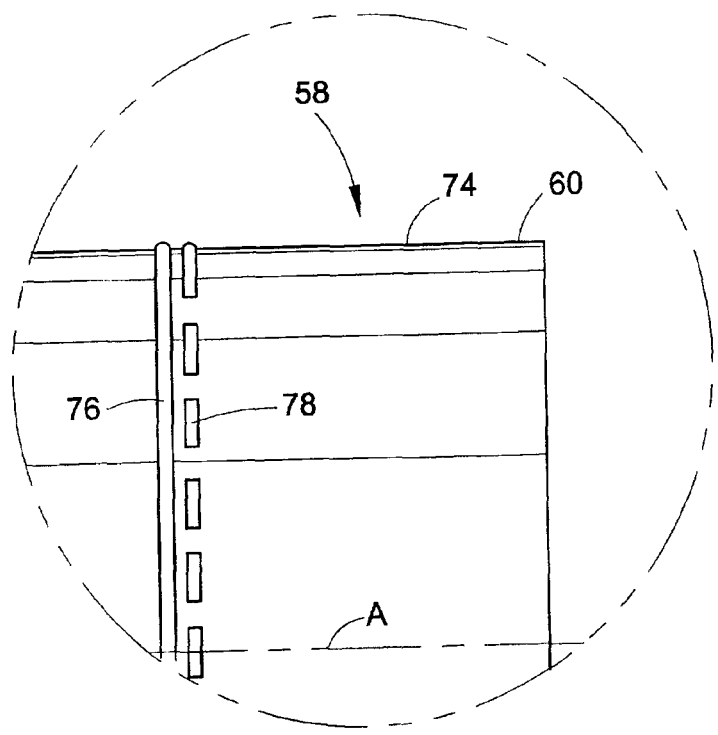
FIG. 7 is a elevational view of the fusion tapping tee branch shown FIG. 4.

The converter 58 also includes an external surface 74 having a head marker 76. The head marker 76 is aligned in the axial direction with the reduction shoulder 70 as shown by the dotted line 77 in FIG. 6 to provide an externally visible indication of where the fusion surface 68 ends. The head marker 76 can be any known marker, such as a marker formed by a raised portion or recess disposed on the external surface 74. In an example, which should not be considered limiting, the head marker 76 can be a raised portion forming a continuous line extending completely around the external surface 74 as shown in FIG. 7, although alternatively it may not be continuous. In the example, the head 76 extends approximately 0.005 inches radially outwards beyond the external surface 74 and is approximately 0.030 inches wide, although it may have any suitable dimensions.

A second marker, hereinafter referred to as a cut marker 78, is disposed on the external surface 74 between the head marker 76 and the outlet end 60. The cut marker 78 can be used a reference location of where the converter 58 should be severed when converting from a mechanical coupling to a fusion coupling as shall be described in further detail below. The cut marker 78 is preferably disposed adjacent the head marker 76, approximately 0.06 inches therefrom, although any suitable distance may by used. The cut marker 78 is preferably formed as a dotted line having similar height and width dimensions as the first raised portion. Alternatively, the head marker 76 and cut marker 78 may be formed by stickers, decals or any other suitable markers.

The converter 58 may not include both the head marker 76 and cut marker 78. If the converter 58 only includes the head marker 76, the head marker can be used to indicate the reference location of where the converter is to be severed when converting from a mechanical coupling to a fusion coupling via instructions to sever the converter adjacent to the head marker on the side nearest the mechanical coupling 18.

Figure 8:
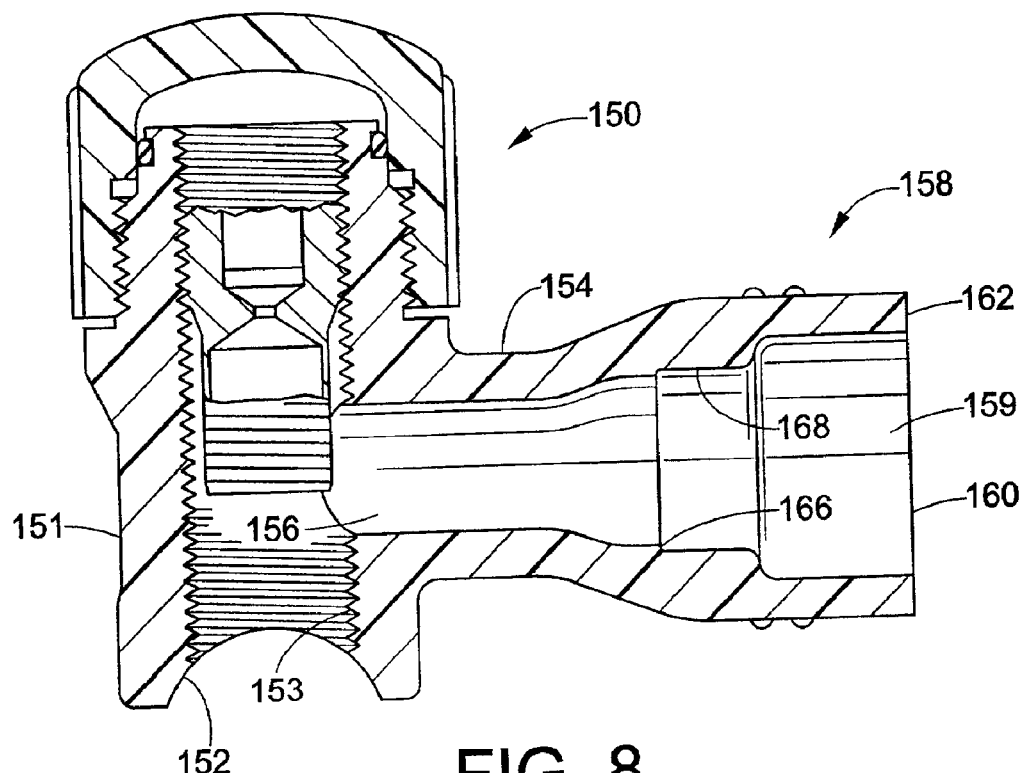
FIG. 8 is a sectional view of an alternate embodiment of the fusion tapping tee shown in accordance with the invention.
Figure 9:
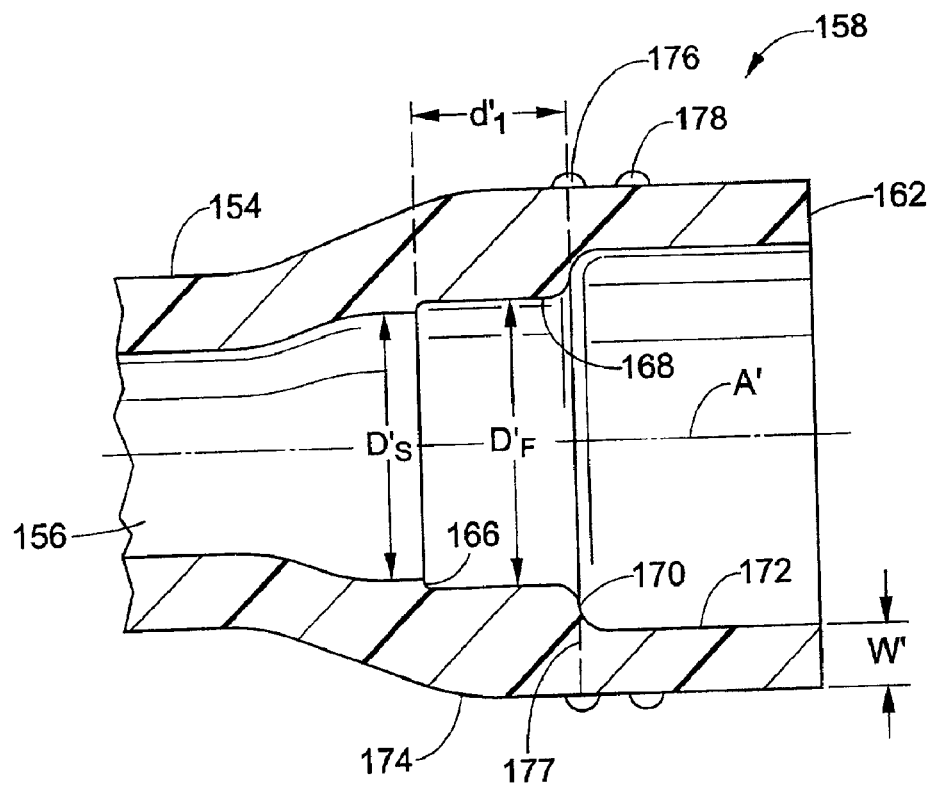
FIG. 9 is an enlarged sectional view of the branch of the alternate embodiment of the fusion tapping tee shown FIG. 8.
Figure 10:
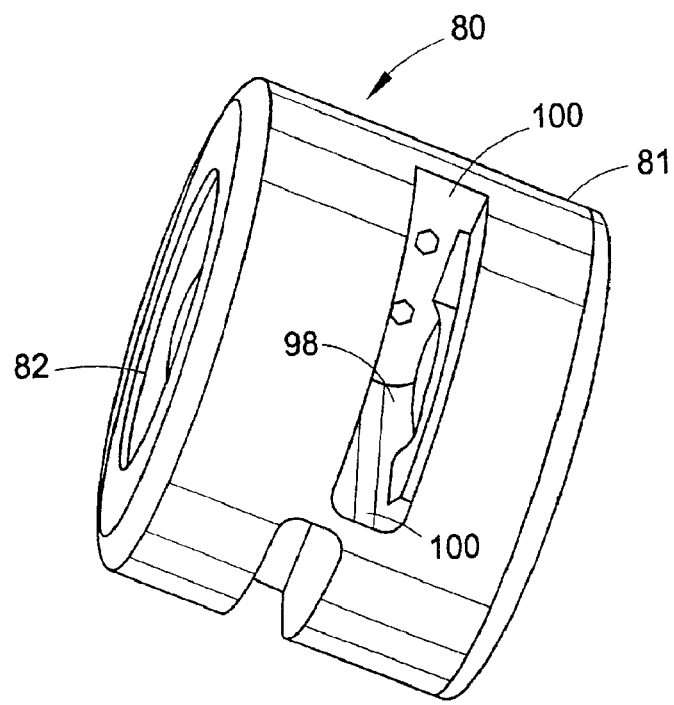
FIG. 10 is a perspective view of the facing tool formed in accordance with the invention.
Figure 11:
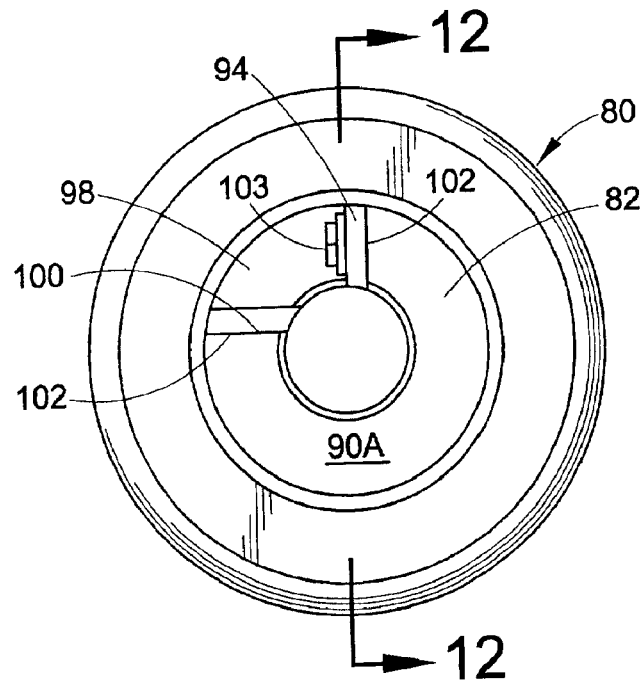
FIG. 11 is a elevational end view of the facing tool formed in accordance with the invention.
Figure 12:
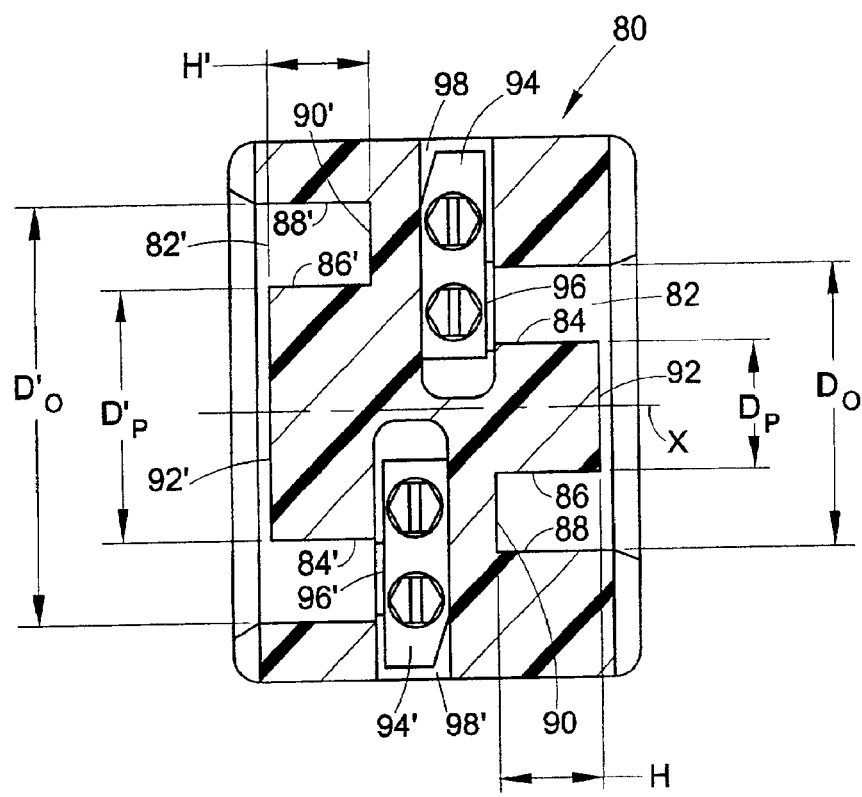
FIG. 12 is a sectional view of the facing tool taken along lines 12—12 of FIG. 11.

Referring now to FIGS. 8 and 9, an alternate embodiment of the fusion tapping tee 50 is shown at 150. The fusion tapping tee 150 includes the same features as the tapping tee 50 described above, although the dimensions may differ as described below. The tapping tee 150 includes tower 151 having an arcuate portion 152 and tower passage 153. The tapping tee 150 also includes a branch 154 having an inner surface 156 forming a branch passage communicating with the tower passage 153.

The tapping tee 150 also includes a converter 158 having an inner surface 159 forming a converter passage communicating with the branch passage 153 in a similar manner as that described above. The converter 158 includes an outlet end 160 having an end surface 162. The converter 158 also includes a stop 166, formed for example by a first shoulder having an inner diameter $D_S'$ (see FIG. 9) and a fusion surface 168 extending from the stop 166 for a predetermined distance d1' as measured along axis A'.

The fusion surface 168 also has a shape which is complementary to the external surface of a pipe for receiving the pipe to form a socket fusion joint as described above. The diameter $D_F'$ of the fusion surface 168 is larger than the diameter $D'_S$ to form the stop 166 described above.

The fusion surface 168 preferably terminates at a second shoulder 170, called a reduction shoulder, thereby defining a second internal surface 172 extending between the reduction shoulder 170 and the converter end surface 162. The wall thickness at the branch end surface 162, shown as W', is preferably approximately equal to the thickness of the mechanical coupling end surface 35, to within 50% to 150% thereof, to facilitate forming a good butt fusion joint 164.

The converter 158 also includes an external surface 174 having a head marker 176 and cut marker 178, both similar in size and location to the head marker 76 and cut marker 78 described above.

In operation, the service line 16 is coupled to the tee 50, 150 and hence the main M, by the mechanical coupling 18. The tee 50, 150 is joined to the main M in any known manner, such as with a heating iron as described above. The mechanical coupling 18 can be fused to the tee 50, 150 in any known manner, such as that described above, either before or after the tee is fused to the gas main M, or alternatively it may be formed integrally therewith.

The service line 16 is inserted into the mechanical coupling 18 where it is gripped and sealed in a known manner such as the manner described above. After securing the service line 16 to the main M, a hole is formed in the main M whereby gas is permitted to flow into the tapping tee 50, 150 and into the service line 16. The main M is pierced in any suitable known manner, such as that described in U.S. Pat. No. 5,425,395 to Brennan, commonly assigned to the same assignee as the present invention and hereby incorporated herein by reference.

A pressure test is then run to determine whether there is any leakage at either the butt fusion joint between the tee 50, 150 and the main M or at the mechanical coupling 18. Assuming that a leak is found in the mechanical coupling 18 after testing, the invention calls for a severing of the mechanical coupling 18 from the branch 54, 154 of the tee 50, 150 by cutting along the branch cut marker 78, 178 thereby leaving an exposed cut end surface such as the cut end surface 62A shown in FIG. 13. The pipe 16 is also severed as shown by line 16a in FIG. 4 to form a cut end 17. The mechanical coupling 18, along with the portion of the pipe mechanically coupled therewith is discarded. Thereafter, a socket fusion joint is made between the remaining length of pipe 16 and the fusion surface 68, 168.

Prior to forming the socket fusion joint, the cut end surface 62A of the tee branch 54 is prepared via a facing operation described below. For this preparation, a facing tool shown generally at 80 in FIGS. 10–13 is used. The facing tool 80 can be formed of any suitable rigid material, such as for example milled aluminum.

The facing tool 80 includes an outer surface 81 which may be knurled to improve gripping of the facing tool 80 by the user. The facing tool 80 also includes an annular recess 82 defined about a coaxially disposed plug 84. The recess 82 is defined by an axially extending inner wall 86 disposed on the outer surface of the plug 84, and an axially extending outer wall 88. The diameter of the plug $D_P$, as defined by the inner wall 86, is sized to be snugly received within the fusion surface 68 of the tee branch 54 as shall be described in further detail below. The outer wall 88 has a diameter $D_O$ larger than the outer diameter of the tee branch cut end surface 62A.

The recess 82 further includes an internal face 90 having at least a semi annular surface 90A disposed perpendicular to the axis of the plug 84, shown at X. The facing tool also includes cutting blade 94 disposed in the recess 82 adjacent the internal face 90. The cutting blade 94 includes a cutting surface 96 disposed adjacent the internal face 90. The plug 84 extends from the internal face 90 to an abutment surface 92 disposed a predetermined height H from the internal face 90 and cutting surface 96. The abutment surface 92 is preferably flat and perpendicular to the plug axis X, although it may not be.

In the preferred embodiment of the facing tool 80, a wedge-shaped recess 98 is formed in the outer surface 81 of the facing tool and extends radially inwardly and into the recess 82 to form a removal chute. The wedge-shaped recess 98 includes radially extending side walls 100 which abut the internal face 90 along edges 102. The cutting blade 94 is secured to one of the side walls 100 in any suitable manner, such as with screws as shown at 103. Alternatively, the edge 102 may be used as the cutting surface 96 eliminating the need for a separate cutting blade 94.

Advantageously, the tool 80 can include an optional second recess 82' and second plug 84' formed on the opposite side of the tool as the recess 82 and plug 84 described above. The second plug 84' has a diameter $D_P'$ sized to be snugly received within the fusion surface 168 of the alternate embodiment of the tee branch 154 shown above. The recess 82' includes an axially extending outer wall 88' having a diameter $D_O'$ which is larger than the outer diameter of the tee branch cut end surface 162A.

The recess 82' further includes an internal face 90', cutting blade 94' and cutting surface 96' similar to those described above. The plug 84' extends from the internal face 90' to an abutment surface 92' similar to the abutment surface 92 described above and disposed a predetermined height H' from the internal face 90' and cutting surface 96'.

A second wedge-shaped recess 98', having radially extending side walls 100', is formed in the outer surface 81 of the facing tool and communicates with the recess 82' in a similar manner as the wedge-shaped recess 98 described above. The recesses 82, 82', plugs 84, 84', and cutting blades 94, 94' enable the tool 80 to be used with two different sized tapping tees, each of which is adapted to be joined to a different sized pipe 16.

Figure 13:
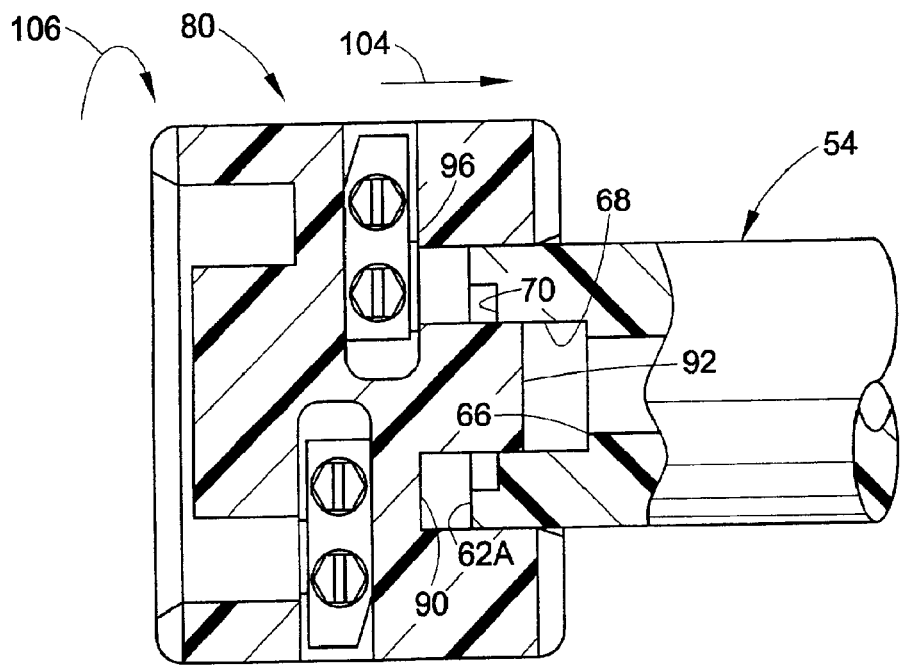
FIG. 13 is a sectional view illustrating the facing operation in accordance with the present invention.

Referring now to FIG. 13, the facing operation shall now be described with reference to the first embodiment of the tapping tee 50. The facing operation is performed by moving the facing tool 80 towards the cut outlet end of the tee branch 60, as shown by arrow 104, so that the plug 84 is received within the passage 59 having the fusion surface 68. The facing tool 80 is pressed against the tee branch 60 until the cut end surface 62A, abuts the internal surface 90 of the facing tool and the cutting surface 96.

The tool 80 is then rotated, as shown by arrow 106, at which time a cutting or facing action occurs. During the cutting action, portions of the cut end surface 62A of the tee branch are removed and exit the tool through the wedge-shaped recess 98. As the facing tool 80 continues to be pressed against the tee branch 54 and rotated, (with portions of the cut end surface 62A being removed) the plug 84 moves axially along the fusion surface 68 toward the first shoulder 66.

The facing operation is continued until the first shoulder 66 receives the abutment surface 92 of the plug 84 in an abutting engagement. Since the diameter $D_P$ of the plug is larger than the inner diameter of the shoulder $D_S$, the first shoulder 66 stops the further insertion of the facing tool plug 84 into the tee branch converter preventing further axial movement of the facing tool 80 and thus further cutting action by the cutting surface 96. Upon completion of the facing operation, the facing tool 80 has formed a faced end 62B (see FIG. 14) on the branch which is smooth and perpendicular to the fusion surface axis A. The facing operation ensures that the fusion surface 68 extends to the faced end 62B and that the length of the fusion surface 66 is uniform and greater than or equal to $F_M$.

After the facing operation has been completed, the pipe 16 is fused to the tapping tee 50 at the fusion surface 68 forming a socket fusion joint in any suitable known manner. To prepare for the fusion step typically, a soft marking utensil, such as a felt tip pen, wax marker or crayon, is used to delineate the stab depth on the pipe end with a mark called stab depth measurement or stab depth line 110 (see FIG. 14). This mark is placed on the external surface of the pipe 16 at a predetermined distance d2 from the cut end 17, wherein $d2 \geq F_M$ and preferably d2=d1.

Figure 14:
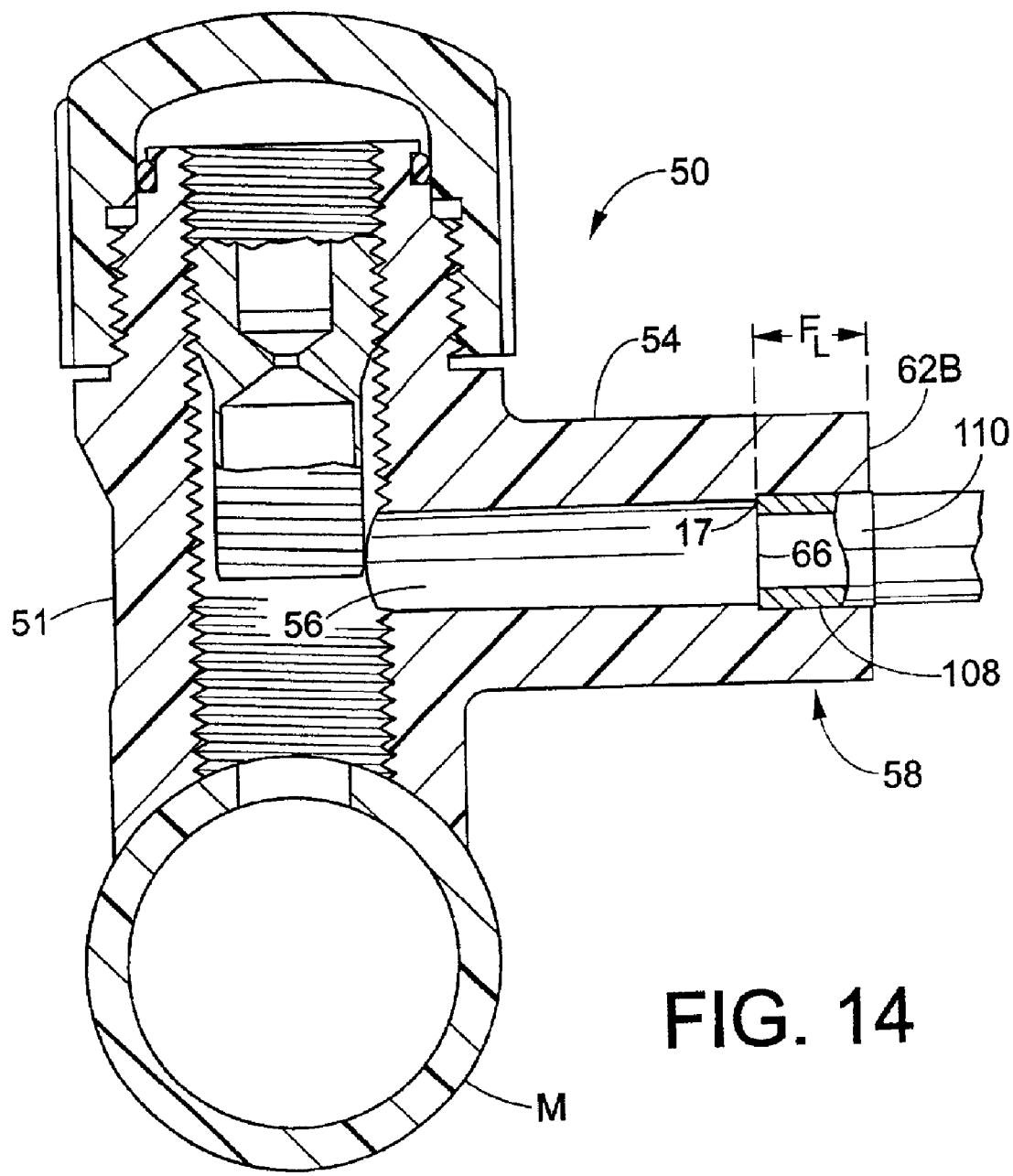
FIG. 14 is a partial sectional view illustrating the fusion tapping tee coupled with a gas main and service line illustrating the socket fusion joint formed in accordance with the present invention.

Next, the outer surface of the pipe 16 and the fusion surface 68 of the tee 50 are heated with one or more heating devices such as heating irons. The heating continues until the plastic softens after which the heating device is removed and the heated pipe end is inserted into the outlet end 60 of the branch. The pipe is inserted into the tee branch a sufficient distance such that the pipe cut end 17 abuts the stop 66 thereby preventing further insertion. The stab-depth line 110 provides a visual indication that the pipe 16 has been inserted the proper amount when it is adjacent to the end surface 62A of the outlet 60 (FIG. 14). The heated fusion surface 68 and the heated external surface of the pipe are allowed to cool and fuse thereby creating the socket fusion joint as shown at 108 in FIG. 14. The fusion joint includes a desired fusion length $F_L$ as measured along the fusion surface axis A.

Applicable codes and regulations require that the fusion length $F_L$ of a socket fusion joint 108 extend at least for a minimum distance, which is hereinafter called the minimum fusion surface length $F_M$. The minimum fusion surface length $F_M$ preferably extends along the axis A. The magnitude of $F_M$ may depend upon the diameter of the pipe being joined as determined by the applicable codes and regulations in effect. For example, some codes require a minimum fusion surface length $F_M$ of 0.625 inches for a socket fusion joint with a ½" diameter pipe, although $F_M$ may be any suitable distance as required.

The plug height H, H' of the facing tool 80 is selected such that as the plug bottoms on the shoulder 66 at least the minimum fusion surface length $F_M$ is formed if the pipe end 16 is thrust into the tee branch to the stab depth line 110 during fusing. Thus, performing the facing operation with the facing tool 80 on the tee branch 54, 154 having the converter 58, 158 ensures that the fusion surface 68, 168 extends to the faced end 62B of the converter and that the axial length of the fusion surface d1, d1' is equal to or greater than the minimum fusion surface length $F_M$. Also, performing the facing operation with the facing tool ensures that the faced end surface 62B, 162B of the tee outlet 60 is smooth and perpendicular to the fusion surface axis A, A' Thus, performing the facing operation with the facing tool 80 ensures uniformity and reliability for every socket fusion joint 108 formed.

The method and apparatus just described provide for a solution to the problem of a leaking mechanical coupling 18 in a tapping tee 50 that has been joined to a main. The invention makes it possible to avoid replacing an installed tee which has a leaking mechanical coupling.

What was originally a tapping tee having a mechanical joint at the service line 16, is now converted to a fusion joint assembly.

The invention also makes it possible for the user, such as a gas utility, to purchase what amounts to a dual use tee that may be used for either a mechanical coupling installation or, at the option of the user, a fusion installation.

Figure 15:
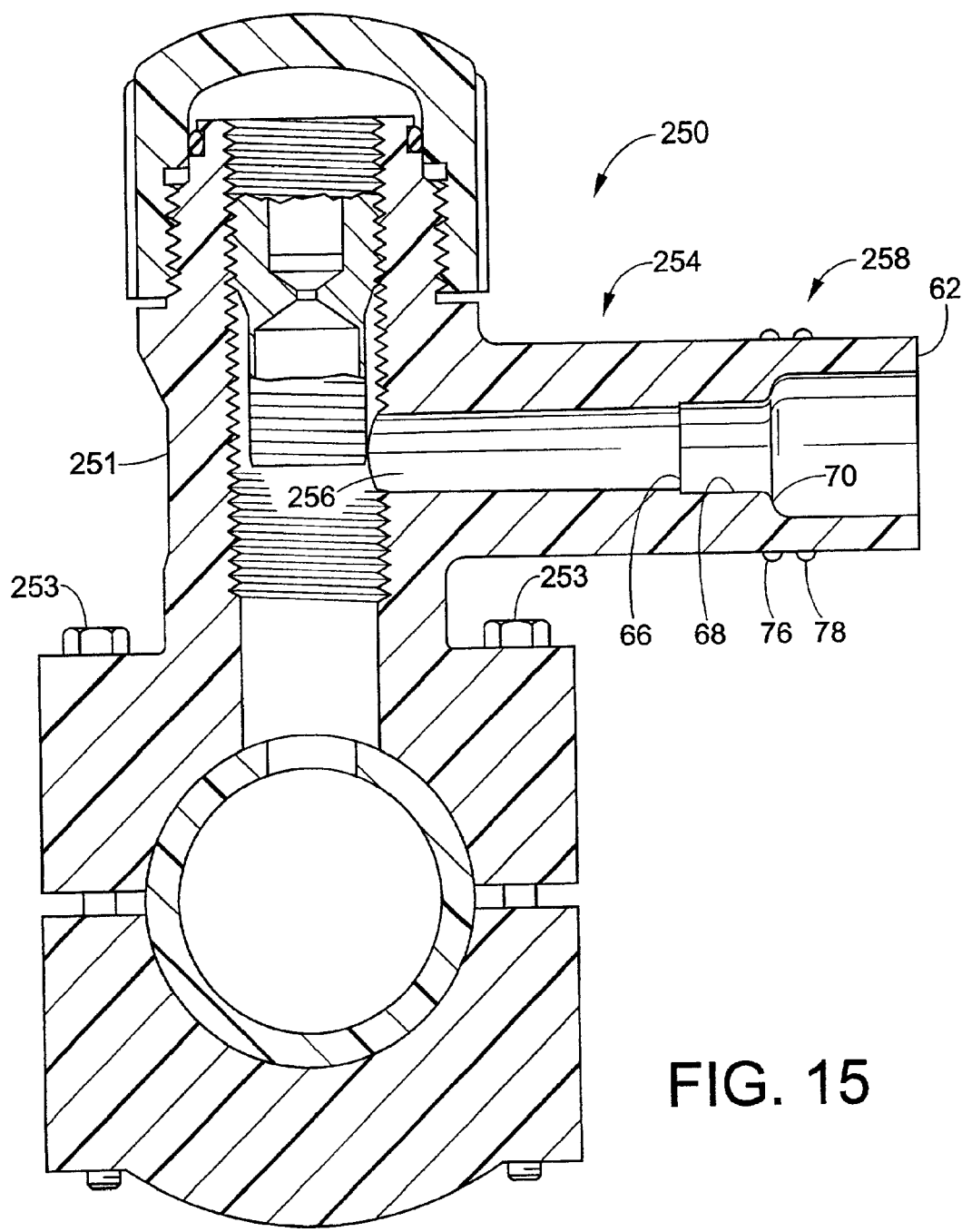
FIG. 15 is a sectional view of a second embodiment of the tapping tee in accordance with the invention.

It should be understood that the invention is not limited to the environment of a fusion tapping tee 50, 150, but is applicable to any suitable tapping tee including a tapping tee, shown generally at 250 in FIG. 15, including a mechanical coupling for forming a mechanical joint with the main M using fasteners 253. The details concerning the structure and method for attaching the tee 250 to the main M and for piercing the main are described in the above referenced U.S. Pat. No. 5,425,395.

The tapping tee 250 includes a branch 254 with a converter 258 having the same features as the converter 58 described above, including but not limited to a shoulder 66, fusion surface 68 extending for a distance d1, and first and second raised portions 76 and 78.

Figure 16:
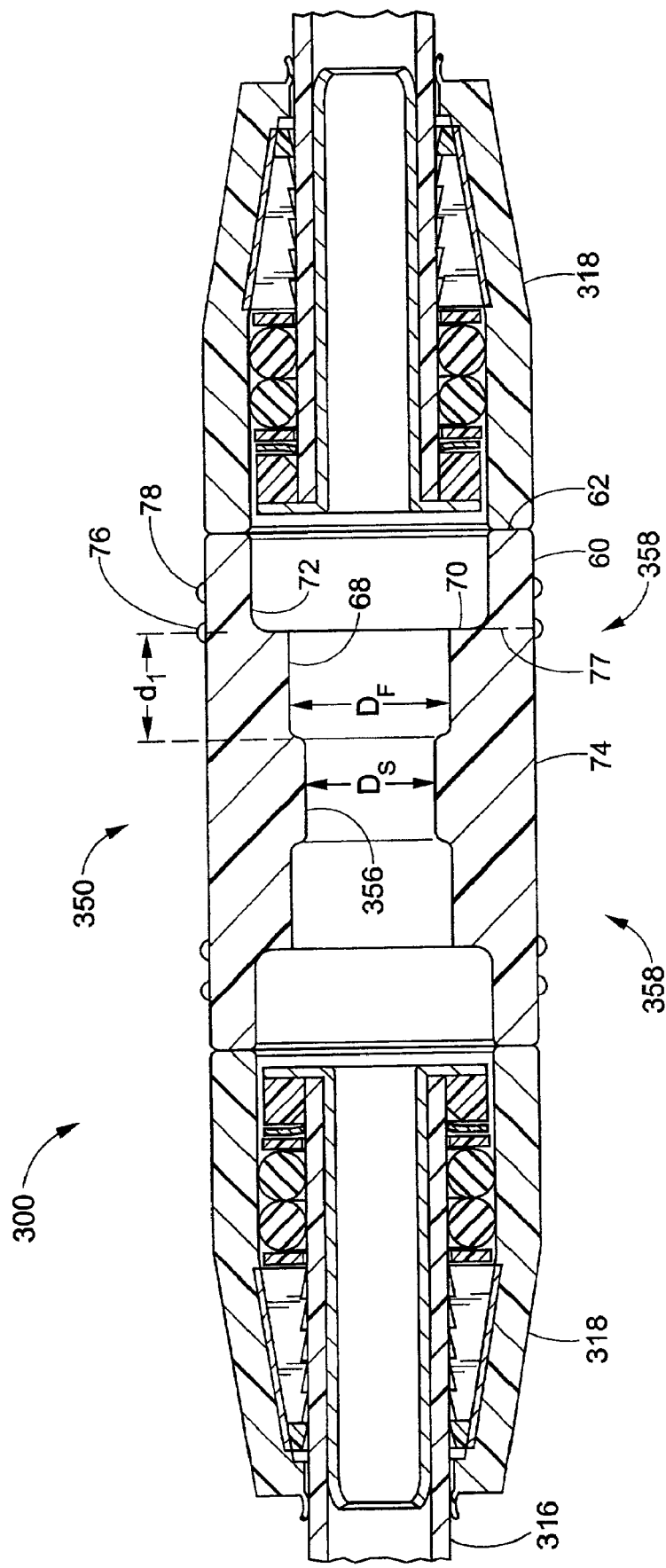
FIG. 16 is a sectional view of a coupling assembly in accordance with the invention.

It should be further understood that the invention is not limited to the environment of tapping tees 50, 150, 250, but may be used in any structure where there is a need to convert a mechanical coupling to a fusion coupling. For example, referring to FIG. 16 there is shown a double-ended mechanical coupling assembly at 300 by means of which two tubes or pipes 316 may be joined together.

The coupling assembly 300 includes a converter element 350 and pair of mechanical couplers 318, each disposed at opposite ends of the converter element for providing a mechanical coupling with the pipes 316 upon initial installation as described above. The mechanical couplers 318 can be any suitable known mechanical couplers such as the mechanical coupler 18 described above. The converter element 350 includes an inner surface 356 forming a central passage providing communication between the pipes 316. The converter element 350 is preferably formed of plastic, such as polyethylene, or any other suitable known material for forming fusion joints.

The converter element 350 further includes a pair of converter segments 358, each disposed at an opposite end of the converter element 350, preferably adjacent the mechanical couplings 318. Each converter segment 358 is similar to the converter 58 described above, having the same components and features and these are illustrated with like reference numerals.

In operation, the coupling assembly 300 initially includes the mechanical couplings 318 joined to the converter element 350 in a known manner such as with butt fusion joints as described above. The pipes 316 are joined together by stabbing the pipes 316 into the respective ends of the mechanical couplings 318 as described above. If a leak is found at one or both of the mechanical couplings, the converter 358 is severed at the cut marker 78 as described above. The pipe 316 is also severed and the leaking mechanical coupling is discarded. A facing operation is then performed with the facing tool 80 as described above. Finally, the pipe is fused to the converter element by a socket fusion joint as described above.

It should be understood that the present invention also applies to any other suitable fitting such as tees, elbows, and the like to provide a simple conversion from a mechanical coupling to a socket fusion joint by the installer.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A converter for converting a mechanical joint joining the converter to a pipe to a fusion socket joint joining the converter to the pipe, the converter comprising:

a body having an inner surface forming a passage and an outer surface;

a stop disposed on the inner surface;

a fusion surface formed on the inner surface for forming the fusion socket joint, the fusion surface extending from the stop for a distance d1; and a marker disposed on the outer surface for providing a reference location as to where the body can be severed when converting from the mechanical joint to the fusion joint to keep $d1 \geq F_M$, wherein $F_M$ is the minimum fusion surface length allowable for the fusion socket joint.

2. The converter defined in claim 1 wherein the passage is adapted to receive a facing tool inserted therein during a facing operation for removing portions of the severed end to form a faced end such that the fusion surface extends from the faced end for a uniform distance d1 and d1≧$F_M$, and the stop is adapted to abut the facing tool thereby preventing the further insertion of the facing tool and the further removal of portions of the severed end.

3. The converter defined in claim 2 wherein the stop is a shoulder having an inner diameter $D_S$ and the fusion surface is cylindrical having a diameter $D_F$ for forming a fusion socket joint, wherein $D_S<D_F$.

4. The converter defined in claim 1 further comprising a mechanical coupling extending from the body for providing the mechanical joint joining the converter to the pipe.

5. The converter defined in claim 4 wherein the mechanical coupling is a stab-type coupling.

6. The converter defined in claim 1 wherein the marker is a cut marker disposed at an axial distance from the stop greater than $F_M$.

7. The converter defined in claim 1 wherein the body further comprises an end surface adapted for forming a fusion butt joint with the body of a mechanical coupling for providing the mechanical joint for joining the converter to the pipe.

8. The converter defined in claim 7 further comprising a reduction shoulder formed in the passage at an axial distance d1 from the stop and defining a transition to a thinner walled body having a thickness W at the end surface, wherein W is approximately equal to the thickness of the mechanical coupling body.

9. The converter defined in claim 8 wherein the marker is a head marker aligned in the axial direction with the reduction shoulder and the reference location is adjacent the head marker.

10. The converter defined in claim 1 wherein the converter extends from a tapping tee for joining the tapping tee to the pipe.

11. The converter defined in claim 1 wherein the converter extends from a union joining the union to the pipe.

12. The converter defined in claim 1 wherein the converter extends from an elbow joining the elbow to the pipe.

13. The converter defined in claim 1 wherein the converter extends from an in-line connector joining the in-line connector to the pipe.

14. A converter for use in combination with a facing tool for converting a mechanical joint joining the converter to a pipe to a fusion socket joint joining the converter to the pipe, the facing tool having a cutting surface and a plug with an abutment surface disposed a predetermined distance from the cutting surface, the converter comprising:
a body having an inner surface forming a passage for communicating with the pipe and an outer surface;
a stop disposed on the inner surface for receiving the abutment surface of the facing tool;
a fusion surface for forming the fusion socket joint formed on the inner surface and extending from the stop for a distance d1; and
a marker disposed on the outer surface for providing a reference location as to where the body can be severed when converting from the mechanical joint to the fusion joint to keep d1≧$F_M$, wherein $F_M$ is the minimum fusion surface length allowable for the fusion socket joint.

15. The converter defined in claim 14 further comprising a mechanical coupling extending from the body for providing the mechanical joint joining the converter to the pipe.

16. The converter defined in claim 15 wherein the body further comprises an end surface adapted for forming a fusion butt joint with a mechanical coupling for providing the mechanical joint for joining the converter to the pipe.

17. The converter defined in claim 14 wherein the converter extends from a tapping tee for joining the tapping tee to the pipe.

18. The converter defined in claim 14 wherein the converter extends from a union for joining the union to the pipe.

19. The converter defined in claim 14 wherein the converter extends from an elbow for joining the elbow to the pipe.

20. The converter defined in claim 14 wherein the converter extends from an in-line connector for joining the in-line connector to the pipe.

21. A tapping tee for joining a pipe to a tapped line comprising:
a tower having a passage for communicating with the tapped line;
a branch extending from the tower having a branch passage communicating with the tower passage;
a converter extending from the branch for converting a mechanical joint joining the converter to the pipe to a fusion socket joint joining the converter to the pipe, the converter comprising:
a body having an inner surface forming a converter passage communicating with the branch passage and an outer surface;
a stop disposed on the inner surface;
a fusion surface formed on the inner surface for forming the fusion socket joint, the fusion surface extending from the stop for a distance d1; and
a marker disposed on the outer surface for providing a reference location as to where the body can be severed when converting from the mechanical joint to the fusion joint to keep d1≧$F_M$, wherein $F_M$ is the minimum fusion surface length allowable for the fusion socket joint.

22. The tapping tee defined in claim 21 wherein the converter passage is adapted to receive a facing tool inserted therein during a facing operation for removing portions of the severed end to form a faced end such that the fusion surface extends from the faced end for a uniform distance d1 and d1≧$F_M$, and the stop is adapted to abut the facing tool thereby preventing the further insertion of the facing tool and the further removal of portions of the severed end.

23. The tapping tee defined in claim 21 wherein the stop is a shoulder having an inner diameter $D_S$ and the fusion surface is cylindrical having a diameter $D_F$ for forming a fusion socket joint, wherein $D_S<D_F$.

24. The tapping tee defined in claim 21 further comprising a mechanical coupling extending from the body for providing the mechanical joint joining the converter to the pipe.

25. The tapping tee defined in claim 24 wherein the mechanical coupling is a stab-type coupling.

26. The tapping tee defined in claim 21 wherein the marker is a cut marker disposed at an axial distance from the stop greater than $F_M$.

27. The tapping tee defined in claim 21 wherein the body further comprises an end surface adapted for forming a fusion butt joint with the body of a mechanical coupling for providing the mechanical joint for joining the converter to the pipe.

28. The tapping tee defined in claim 27 further comprising a reduction shoulder formed in the converter passage at an axial distance d1 from the stop and defining a transition to a thinner walled body having a thickness W at the end surface, wherein W is approximately equal to the thickness of the mechanical coupling body.

29. The tapping tee defined in claim 28 wherein the marker is a head marker aligned in the axial direction with the reduction shoulder and the reference location is adjacent the head marker.

30. The tapping tee defined in claim 21 wherein the tapping tee is a fusion tapping tee having an arcuate surface for forming a fusion joint joining the tapping tee to the tapped line.

31. The tapping tee defined in claim 21 wherein the tapping tee is a mechanical tapping tee having a mechanical coupling for forming a mechanical joint joining the tapping tee to the tapped line.

32. A facing tool for performing a facing operation on the end surface of a converter for converting a mechanical joint joining the converter to a pipe to a fusion socket joint joining the converter to the pipe, the converter having a body with an internal surface forming a passage, a stop disposed on the internal surface, and a fusion surface formed on the internal surface and extending from the stop for forming the fusion socket joint with a fusion length $F_L$, the facing tool comprising:

a cutting surface for removing material from the end surface of the converter during the facing operation;

a plug disposed adjacent the cutting surface and having an abutment surface extending a distance H from the cutting surface wherein $H=F_L \geq F_M$ and $F_M$ is the minimum fusion surface length allowable for the fusion socket joint, the plug adapted to be received within the passage such that the plug abutment surface abuts the stop to prevent further movement of the facing tool into the passage during the facing operation thereby preventing the further removal of material from the end surface of the converter.

33. The facing tool defined in claim 32 wherein the passage has a circular cross section and the plug is cylindrical having a diameter $D_P$ sized to be snugly received within the passage and further comprising an annular recess coaxially disposed about the cylindrical plug and having an internal face disposed adjacent the cutting surface at a distance H from the abutment surface.

34. The facing tool defined in claim 33 wherein the internal face is perpendicular to the axis of the plug for forming the end surface of the converter perpendicular to the axis of the cylindrical fusion surface.

35. The facing tool defined in claim 34 further comprising a removal chute for receiving the material removed from the end surface of the converter.

36. The facing tool defined in claim 35 wherein the removal chute is a recess extending radially inwardly from the outer surface into the annular recess.

37. The facing tool defined in claim 36 wherein the removal chute is a wedge shaped recess.

38. The facing tool defined in claim 37 wherein the cutting surface is a cutting blade secured to a wall of the wedge shaped recess.

39. The facing tool defined in claim 36 wherein the cutting surface is an edge formed by the intersection of the removal chute and the internal face.

40. The facing tool defined in claim 33 wherein the annular recess is disposed at a first end of the facing tool, and further comprising:

a second annular recess disposed at a second end, opposite the first end, and defining a coaxially disposed second plug having a diameter $D_P'$, an outer wall, and an internal face disposed between the inner and outer walls, the plug extending from the internal face for a height H'; and a cutting surface disposed within the second recess adjacent the internal face.

41. A facing tool for performing a facing operation on the end surface of a converter for converting a mechanical joint joining the converter to a pipe to a fusion socket joint joining the converter to the pipe, the converter having a body with an internal surface forming a passage, a stop disposed on the internal surface, and a fusion surface formed on the internal surface and extending from the stop for forming the fusion socket joint with a fusion surface length $F_L$, the facing tool comprising:

an annular recess having an inner wall defining a coaxially disposed cylindrical plug having an abutment surface and a diameter $D_P$ sized to be received within the passage, an outer wall, and an internal face disposed between the inner and outer walls, the plug extending from the internal face along an axis for a height H, wherein $H \geq F_M$, and $F_M$ is the minimum axial length of fusion surface allowable for the fusion socket joint; and a cutting surface disposed within the recess adjacent the internal face for removing material from the end surface of the converter during the facing operation until the plug abutment surface abuts the stop thereby providing a uniform fusion surface length $F_L=H$.

* * * * *